(12) United States Patent
Gao et al.

(10) Patent No.: US 9,319,266 B2
(45) Date of Patent: Apr. 19, 2016

(54) METHOD AND APPARATUS FOR MANAGING DIAMETER ROUTING

(71) Applicant: HUAWEI TECHNOLOGIES CO., LTD., Shenzhen (CN)

(72) Inventors: Wei Gao, Shenzhen (CN); Feng Wu, Shenzhen (CN); Xiangrui Kong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 182 days.

(21) Appl. No.: 14/103,212

(22) Filed: Dec. 11, 2013

(65) Prior Publication Data

US 2014/0098659 A1    Apr. 10, 2014

Related U.S. Application Data

(63) Continuation of application No. PCT/CN2011/077924, filed on Aug. 2, 2011.

(51) Int. Cl.
| | |
|---|---|
| *G01R 31/08* | (2006.01) |
| *H04L 12/24* | (2006.01) |
| *H04L 12/707* | (2013.01) |
| *H04L 12/703* | (2013.01) |

(52) U.S. Cl.
CPC ............ *H04L 41/0654* (2013.01); *H04L 45/22* (2013.01); *H04L 45/28* (2013.01)

(58) Field of Classification Search
USPC .......................... 370/217, 221, 225, 228, 252
See application file for complete search history.

(56) References Cited

U.S. PATENT DOCUMENTS

| 6,181,680 B1 * | 1/2001 | Nagata et al. ................. 370/248 |
|---|---|---|
| 2004/0114595 A1 * | 6/2004 | Doukai .......................... 370/389 |

(Continued)

FOREIGN PATENT DOCUMENTS

| CN | 101141391 A | 3/2008 |
|---|---|---|
| CN | 101931586 A | 12/2010 |

(Continued)

OTHER PUBLICATIONS

Chaouchi et al., "Signalling analysis in integrated 4G networks" International Journal of Network Management, 16, 2006, pp. 59-78.

(Continued)

*Primary Examiner* — Ricky Ngo
*Assistant Examiner* — Christine Ng
(74) *Attorney, Agent, or Firm* — Brinks Gilson & Lione

(57) ABSTRACT

A method and a network device for managing Diameter routing are disclosed in the communication technology. The network device avoids frequently sending a Diameter message on a faulty routing. In the method: a network apparatus receives a first Diameter message configured to be delivered to a destination node. The network apparatus determines a routing status of a primary routing from the network apparatus to the destination node according to recorded routing status from the network apparatus to the destination node. The network apparatus sends the first Diameter message through the primary routing if the routing status of the primary routing is normal. The network apparatus sends the first Diameter message through an alternative routing from the network apparatus to the destination node if the routing status of the primary routing is faulty.

13 Claims, 4 Drawing Sheets

(56) References Cited

U.S. PATENT DOCUMENTS

| | | | |
|---|---|---|---|
| 2009/0034971 A1* | 2/2009 | Sadanada | 398/49 |
| 2009/0310483 A1* | 12/2009 | Okazaki | 370/228 |
| 2010/0287406 A1 | 11/2010 | Ishii | |
| 2011/0026460 A1 | 2/2011 | Lafuente Alvarez et al. | |
| 2011/0200053 A1* | 8/2011 | Kanode et al. | 370/401 |

FOREIGN PATENT DOCUMENTS

| | | |
|---|---|---|
| CN | 102055664 A | 5/2011 |
| JP | 7-221791 A | 8/1995 |
| JP | 2004-537206 A | 12/2004 |
| JP | 2005-354579 A | 12/2005 |
| JP | 2009-182541 A | 8/2009 |
| JP | 2010-541348 A | 12/2010 |
| JP | 2011-003983 A | 1/2011 |
| WO | WO 03/005629 A1 | 1/2003 |
| WO | WO 2009/039890 A1 | 4/2009 |

OTHER PUBLICATIONS

Fajardo et al., "Diameter Base Protocol" DIME Internet Draft, 2011, 156 pages.

* cited by examiner

Step 301: DRA1 receives a Diameter message sent by Client, DEST-HOST of the Diameter message is Server Step 302: DRA1 queries the route status of a primary routing from DRA1 to Server in the recorded routing status of routings from DRA1 to Server, and determines that the routing stature of the primary routing is normal Step 303: DRA1 selects the primary routing to send the Diameter message sent by Client; namely sends the Diameter message to DRA3, wherein DEST-HOST of the Diameter message is Server Step 304: DRA1 receives an ERROR message returned by DRA3

Step 305: DRA1 modifies the recorded routing status of DRA1-DRA3-Server as faulty and resends the Diameter message through the alternative routing DRA1-DRA2-DRA4-Server, namely sends the Diameter message to DRA2, and sends the Diameter message to Server through DRA2

FIG. 3

METHOD AND APPARATUS FOR MANAGING DIAMETER ROUTING

CROSS-REFERENCE TO RELATED APPLICATION

This application is a continuation of International Application No. PCT/CN2011/077924, filed Aug. 2, 2011, which is hereby incorporated by reference in its entirety.

FIELD

The present disclosure relates to the field of communication technology, and more particularly, to a method and an apparatus for managing Diameter routing.

BACKGROUND

Diameter protocol is a protocol widely applied in the networks of Policy Control and Charging PCC (Policy Control and Charging) Architecture and Long Term Evolution LTE (Long Term Evolution), network interconnection protocol IP (International Protocol) Multimedia Subsystem IMS (IP Multimedia Subsystem) in 3G (3rd-Generation, the $3^{rd}$ mobile communication system) networks. Arranged in a Diameter network is a Diameter message Routing Agent DRA (Diameter Routing Agent) which supplies a message routing function of Diameter signaling, and can achieve centralized forwarding of Diameter signaling in a multi-network architecture.

During the process of forwarding of Diameter signaling in DRA, according to current Diameter protocol, supposing that there are two routings from DRA1 to a Diameter master server including:

Routing 1: DRA1-DRA2-Diameter master server
Routing 2: DRA1-DRA3-Diameter master server Upon reception of a message required to be sent to the Diameter master server, according to routing priority, Routing 1 is firstly selected to send this message. If the link from DRA2 to the Diameter master server is faulty at this time, it is impossible for the message to be delivered to the Diameter master server, namely Routing 1 is inaccessible. At this time, DRA1 may receive an error response "DIAMETER_UNABLE_TO_DELIVER" from DRA2, and resend the message through routing 2. During the period when the link from DRA2 to the Diameter master server is faulty, if DRA1 again receives a message required to be sent to the Diameter master server, it may still select Routing 1 for sending, and resend the message after an error response from DRA2 is received.

The aforementioned method of signaling forwarding may result in the fact that the message is frequently sent by DRA1 on a faulty routing, which not only wastes the capacity of the link, but also increases message forwarding time delay and affect a user's business experience.

SUMMARY

It is a major objective of embodiments of the present disclosure to provide a method and an apparatus for managing Diameter routing, which can effectively avoid frequently sending a Diameter message on a faulty routing.

To arrive at the above objective, the following solutions are assumed in the embodiments of the present disclosure:

On the one hand, the embodiments of the present disclosure provide a method for managing Diameter routing. The method includes: receiving, by a network apparatus, a first Diameter message configured to be delivered to a destination node; determining, by the network apparatus, a routing status of a primary routing from the network apparatus to the destination node, according to a recorded routing status from the network apparatus to the destination node; sending, by the network apparatus, the first Diameter message through the primary routing if the routing status of the primary routing is normal; and sending, by the network apparatus, the first Diameter message through an alternative routing from the network apparatus to the destination node, if the routing status of the primary routing is faulty.

On the other hand, the embodiments of the present disclosure provide a network apparatus. The network apparatus includes a hardware processor and a non-transitory storage medium. The network apparatus includes: a recording unit configured to record routing status from the network apparatus to a destination node; a receiving unit configured to receive a first Diameter message configured to be delivered to a destination node; a determining unit configured to determine a routing status of a primary routing from the network apparatus to the destination node, according to the recorded routing status; and a sending unit configured to send the first Diameter message through the primary routing if the routing status of the primary routing is normal, and to send the first Diameter message through an alternative routing from the network apparatus to the destination node if the routing status of the primary routing is faulty.

In case that the above solutions are assumed, by the method and the apparatus for managing Diameter routing provided by the embodiments of the present disclosure, when receiving a first Diameter message required to be sent to a destination node, a network apparatus can query routing status from the network apparatus to the destination node, and select a routing in a normal state to send the first Diameter message, whereby frequently sending a Diameter message on a faulty routing can be effectively avoided, thereby effectively avoiding wasting the capacity of the link, decreasing message forwarding time delay and obviously prompting a user's business experience.

BRIEF DESCRIPTION OF THE DRAWINGS

To make more clearly the explanation of solutions of the embodiments of the present disclosure, drawings needed in the embodiments are briefly illustrated below. Apparently, the drawings illustrated below are merely directed to some embodiments of the present disclosure, and it is possible for persons ordinarily skilled in the art to deduce other drawings from these drawings without creative effort.

FIG. 3 is one flowchart illustrating the method for managing Diameter routing provided by one embodiment of the present disclosure;

DESCRIPTION OF THE EMBODIMENTS

The solutions in the embodiments of the present disclosure will be described as follows in a clear and complete manner with reference to the drawings in the embodiments of the present disclosure.

Clearly, the embodiments described below are merely partial, rather than entire, embodiments of the present disclosure. On the basis of the embodiments of the present disclosure, all other embodiments obtainable by persons ordinarily skilled in the art without creative effort shall all fall within the protection scope of the present disclosure.

Figure 1:
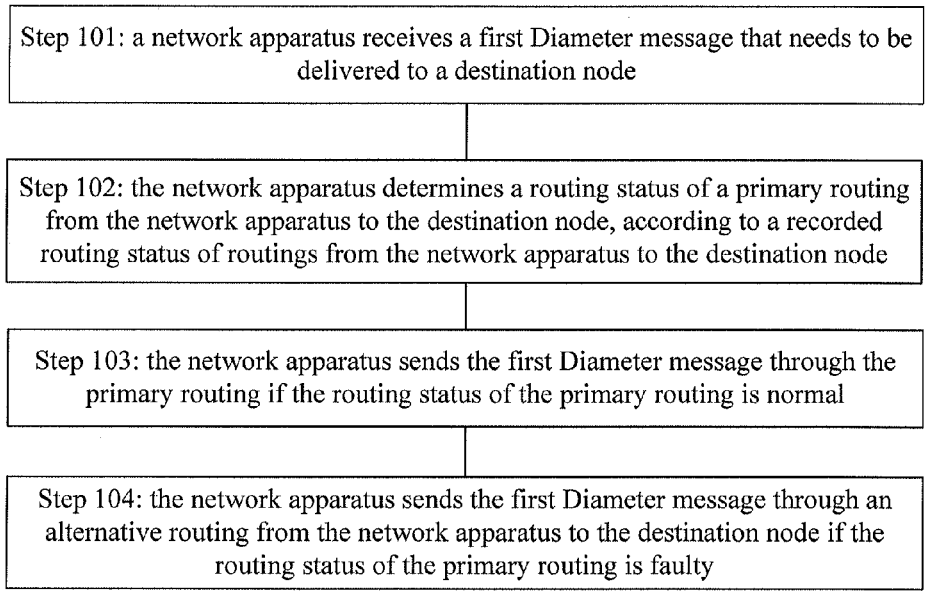
FIG. 1 is one flowchart illustrating the method for managing Diameter routing provided by one embodiment of the present disclosure.

The method provided by one embodiment of the present disclosure, based on a network apparatus in a Diameter network, such as DAR, which includes following steps as shown in FIG. 1:

Step 101: a network apparatus receives a first Diameter message configured to be delivered to a destination node.

Step 102: the network apparatus determines a routing status of a primary routing from the network apparatus to the destination node, according to a recorded routing status from the network apparatus to the destination node.

In the embodiments of the present disclosure, all routings from the network apparatus to the destination node are recorded in the network apparatus. When receiving a Diameter message configured to be delivered to a destination node, the network apparatus can select one routing from the routings recorded therein from the network apparatus to the destination node to forward the message.

In the embodiments of the present disclosure, routing status of all routings from the network apparatus to the destination node is further prerecorded in the network apparatus. The routing status can indicate normal or faulty routings. The network apparatus can query routing status of each routing from the network apparatus to the destination node in the recorded routing status information.

It can be understood that there is at least one routing from the network apparatus to the destination node. The primary routing refers to a routing with the highest priority under the current scene, i.e., when receiving the Diameter message configured to be delivered to a destination node, the network apparatus can firstly select the primary routing to send the message, while an alternative routing described below refers to a routing which priority is lower than that of the primary routing. Priority setting can be the same as that in the prior art, and no more repetition is made here.

Step 103: the network apparatus sends the first Diameter message through the primary routing if the routing status of the primary routing is normal.

Step 104: the network apparatus sends the first Diameter message through an alternative routing from the network apparatus to the destination node if the routing status of the primary routing is faulty.

It can be understood that the alternative routing in Step 104 is an alternative routing in a normal routing status.

In the method for managing Diameter routings provided by one embodiment of the present disclosure, routing status of routings from the network apparatus to the destination node are recorded in the network apparatus; when receiving a first Diameter message configured to be delivered to a destination node, the network apparatus can query the routing status of routings from the network apparatus to the destination node, and select a routing in a normal state to send the first Diameter message, whereby frequently sending a Diameter message on a faulty routing can be effectively avoided, thereby effectively avoiding wasting the capacity of the link, decreasing message forwarding time delay and obviously prompting a user's business experience.

Further, in one embodiment of the present disclosure, if the primary routing recorded in the network apparatus is normal, the network apparatus can send the first Diameter message through the primary routing. If a link in the primary routing from a network apparatus adjacent to the network apparatus to the destination node is interrupted, i.e., the primary routing is faulty, the network apparatus adjacent to the network apparatus is unable to forward the Diameter message, and return an error message, such as "DIAMETER_UNABLE_TO_DELIVER", to the network apparatus. As this time, the method for managing Diameter routing provided by one embodiment of the present disclosure further includes:

receiving, by the network apparatus, an error message returned through the primary routing, which indicates the failure of delivery of the first Diameter message to the destination node;

modifying, by the network apparatus, the routing status of the primary routing as faulty, and resending the first Diameter message through the alternative routing.

Thus, if the network apparatus continues to receive a Diameter message configured to be delivered to the destination node later, it can query that the primary routing from the network apparatus to the destination node is faulty according to the recorded routing status, and send to the continuously received Diameter message through the alternative routing from the network apparatus to the destination node, whereby frequently sending a Diameter message on the faulty primary routing can be effectively avoided.

Optionally, in the embodiments of the present disclosure, under an initial status when the network is put into use, or a restart status, the routing status of all routings from the network apparatus to the destination node are recorded as normal in the network apparatus, in turn, in the process of using the network apparatus, if a Diameter message is unsuccessfully sent through one routing, after having received an error message returned through this routing, the network apparatus modifies a routing status corresponding to this routing as faulty; or, optionally, under an initial status when the network is put into use, or a restart status, each of the routing status of all routings from the network apparatus to the destination node are blank or not recorded, in turn, in the process of using the network apparatus, if a Diameter message is sent through one routing for the first time and it is successfully, the network apparatus records a routing status corresponding to this routing as normal, if the message is unsuccessfully sent, after having received an error message returned through this routing, the network apparatus records a routing status corresponding to this routing as faulty; when the network apparatus again sends a Diameter message through the routing whose routing status has been recorded as normal, if the message is unsuccessfully sent, the network apparatus modifies the routing status of this routing from normal to faulty.

Further, if the above failure of the primary routing is relieved, in order to allow the network apparatus to learn that the failure of the primary routing has been relieved in time so that the operation of the primary routing can be resumed, a first predetermined time can be set in the embodiments of the present disclosure. Optionally, this first predetermined time starts timing at the moment when the routing status of the primary routing is modified from normal to faulty. Certainly, this first predetermined time further can starts timing from other moment, no definition is made on this point in the present disclosure. During the first predetermined time, the routing status of the primary routing is faulty.

During the first predetermined time, if the network apparatus again receives a Diameter message configured to be delivered to the destination node, optionally, the network apparatus can query the length of the timing, for example, the length from the moment when the routing status of the primary routing is modified from normal to faulty to a current moment hasn't exceeded the first predetermined time, it is thereby determined that the routing status of the primary routing corresponding to the destination node still is faulty; optionally, the network apparatus further can query and determine from the recorded routing statues that the routing status of the primary routing corresponding to the destination node is faulty, and can send again received Diameter message through the alternative routing.

After the first predetermined time, the network apparatus can query the length of the timing, for example, the length from the moment when the routing status of the primary routing is modified from normal to faulty to a current moment has exceeded the first predetermined time, the network apparatus, in one embodiment of the present disclosure, can make an attempt as to whether the primary routing has returned to normal, i.e., after the network apparatus have modified the routing status of the primary routing as faulty, and resent the first Diameter message through the alternative routing, the method further includes:

starting from the moment when the routing status of the primary routing is modified from normal to faulty, after the first predetermined time, sending, by the network apparatus, a second Diameter message through the primary routing, if the network apparatus receives the second Diameter message configured to be delivered to the destination node;

if the message is successfully sent, it indicates that the primary routing has returned to normal, the network apparatus modifies the routing status of the primary routing to be normal.

The length of the first predetermined time is not limited, and any value in 3 sec to 30 sec is preferable.

When network apparatus makes an attempt as to whether the primary routing has returned to normal, i.e., sends the second Diameter message through the primary routing, if the message still is unsuccessfully sent, i.e., receiving an Error message, such as "DIAMETER_UNABLE_TO_DELIVER", returned from an network apparatus adjacent to the network apparatus in the primary routing, namely returned through the primary routing and the error message indicates the failure of delivery of the first Diameter message to the destination node, the network apparatus resumes to starting timing, sends the again received Diameter message through the alternative routing within the second predetermined time. And again, the network apparatus performs the above attempt process after the second predetermined time. I.e., after the network apparatus receives an error message returned through the primary routing indicating the failure of delivery of the second Diameter message to the destination node, the method further includes:

after a second predetermined time, sending, by the network apparatus, a third Diameter message through the primary routing, if the network apparatus receives the third Diameter message configured to be delivered to the destination node; and modifying, by the network apparatus, the recorded routing status of the primary routing to be normal, if the message is successfully sent.

Optionally, this second predetermined time can start timing from the moment when the error message is received after the again received second Diameter message is attempted to be sent through the primary routing. Certainly, this second predetermined time can further start timing from other moment, and no definition is made on this point in the present disclosure. During the second predetermined time, the routing status of the primary routing is faulty.

If the message is successfully sent, the network apparatus modifies the recorded routing status of the primary routing to be normal. If unsuccessfully again, the network apparatus resumes starting timing, for example, from the moment of reception of the error message returned through the primary routing during this attempt process, and again performs the above attempt process after waiting for a certain time, and so on.

As should be noted, the lengths of the second predetermined time and each subsequent timing can be the same as that of the first predetermined time, and any value in 3 sec to 30 sec is preferable. Certainly, they can also be different therewith, for example, the length of timing each can be gradually increased, and no definition is made to this point in the present disclosure.

Further, optionally, if the network apparatus, within the time of each timing or after the network apparatus modifies the routing status of the primary routing as faulty, receives a fourth Diameter message sent by the destination node through the primary routing, it indicates that the primary routing has returned to normal. The network apparatus can modify the routing status of the primary routing to be normal.

According to the method for managing Diameter routing provided by the embodiments of the present disclosure, routing status of all routings from the network apparatus to the destination node are recorded in the network apparatus, the network apparatus can modify the routing status according to an error message returned through the routing sending a Diameter message, and also can learn in time, by timing, that the routing failure is relieved by making an attempt to send the Diameter message through the faulty routing, whereby frequently sending a Diameter message on a faulty routing can be effectively avoided, thereby effectively avoiding wasting the capacity of the link, decreasing message forwarding time delay and obviously prompting a user's business experience.

A method for managing Diameter routing of the present disclosure is described in greater detail below through specific embodiments. Within the following specific embodiments, the above network apparatus is DRA. Of course, the above network apparatus can be other network elements in a Diameter network, which is not limited within the present disclosure. DRA is taken as an example in the following specific embodiments.

Figure 2:
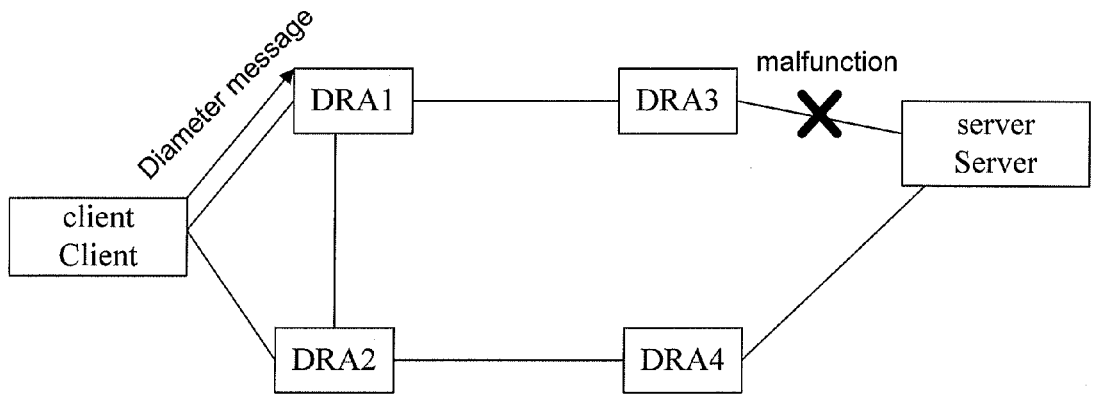
FIG. 2 is one diagram exemplarily illustrating one Diameter network in the method for managing Diameter routing provided by one embodiment of the present disclosure.

As shown in FIG. 2, in the present embodiment, client Client sends a Diameter message whose DEST-HOST (namely the destination node) is server Server through DRA1 which records a routing corresponding to the Server. In this case, a primary routing is DRA1-DRA3-Server, an alternative routing is DRA1-DRA2-DRA4-Server, and both routing status of the primary and alternative routings prerecorded in DRA1 are normal. As shown in FIG. 3, the present embodiment includes:

Step 301: DRA1 receives a Diameter message sent by Client, DEST-HOST of the Diameter message is Server;

Step 302: DRA1 queries the route status of a primary routing from DRA1 to Server in the recorded routing status of routings from DRA1 to Server, and determines that the routing status of the primary routing is normal;

Step 303: DRA1 selects the primary routing to send the Diameter message sent by Client; namely sends the Diameter message to DRA3, wherein DEST-HOST of the Diameter message is Server.

In the present embodiment, a link from DRA3 to Server is faulty. Thus, DRA3 cannot forward the Diameter message whose DEST-HOST is Server, and can return an ERROR message of "DIAMETER_UNABLE_TO_DELIVER" to DAR1. Thus, hereinafter, the present embodiment includes:

Step 304: DRA1 receives an ERROR message returned by DRA3;

Step 305: DRA1 modifies the recorded routing status of DRA1-DRA3-Server as faulty and resends the Diameter message through the alternative routing of DRA1-DRA2-DRA4-Server, namely sends the Diameter message to DRA2, and sends the Diameter message to Server through DRA2.

In this case, DRA1 also can firstly send the Diameter message to DRA2, and then modify the recorded routing status of DRA1-DRA3-Server as faulty. That is, it is not necessary for the above two steps to be performed in sequential order.

After this step, the Diameter message is successfully sent. Then, since the recorded routing status of DRA1-DRA3-Server is faulty, DRA1 cannot send a Diameter message required to be sent to Server through DRA1-DRA3-Server by querying the routing status. Therefore, frequently sending a Diameter message on a faulty routing can be effectively avoided, thereby effectively avoiding wasting the capacity of the link, decreasing message forwarding time delay and obviously prompting a user's business experience.

Figure 4:
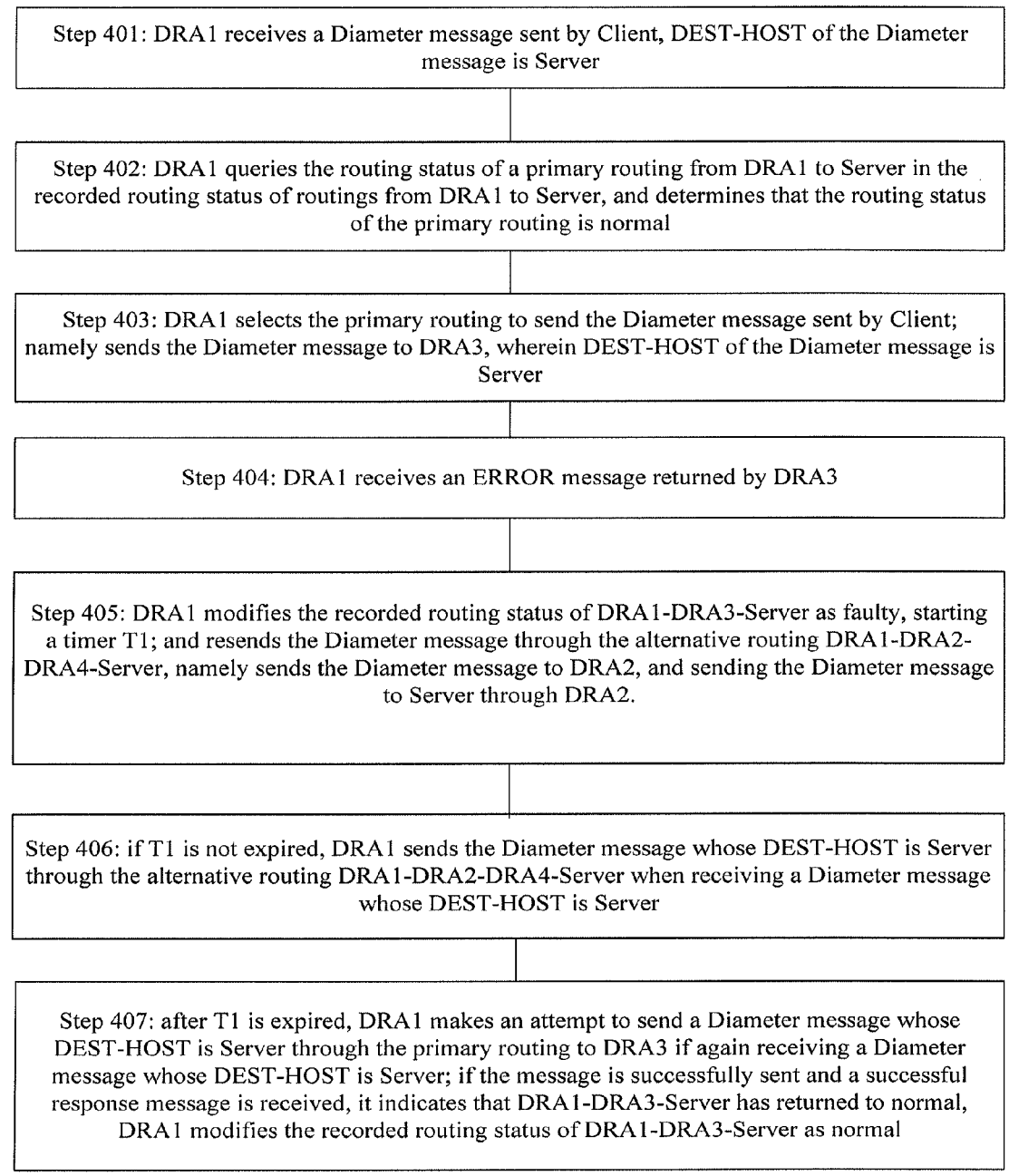
FIG. 4 is one flowchart illustrating the method for managing Diameter routing provided by one embodiment of the present disclosure.

Illustrated in FIG. 4 is another specific embodiment of the present disclosure, which is likewise applied into the Diameter network as shown in FIG. 2. As shown in FIG. 4, Steps 401-403 in this embodiment are same as the first four steps in the embodiment as shown in FIG. 3, and no more repetition is made here, the embodiment includes:

Step 401: DRA1 receives a Diameter message sent by Client, DEST-HOST of the Diameter message is Server;

Step 402: DRA1 queries the route status of a primary routing from DRA1 to Server in the recorded routing status of routings from DRA1 to Server, and determines that the routing status of the primary routing is normal;

Step 403: DRA1 selects the primary routing to send the Diameter message sent by Client; namely sends the Diameter message to DRA3, wherein DEST-HOST of the Diameter message is Server;

Step 404: DRA1 receives an ERROR message returned by DRA3;

Different from the embodiment as shown in FIG. 3, the present embodiment, after Step 404, further includes:

Step 405: DRA1 modifies the recorded routing status of DRA1-DRA3-Server as faulty, starting a timer T1; and resends the Diameter message through the alternative routing of DRA1-DRA2-DRA4-Server, namely sends the Diameter message to DRA2, and sends the Diameter message to Server through DRA2.

Optionally, the value of the timing of T1 is any value in 3 sec to 30 sec.

Step 406: if T1 is not expired, DRA1 sends the Diameter message whose DEST-HOST is Server through the alternative routing DRA1-DRA2-DRA4-Server when receiving a Diameter message whose DEST-HOST is Server;

Step 407: after T1 is expired, DRA1 makes an attempt to send a Diameter message whose DEST-HOST is Server through the primary routing to DRA3 if again receiving a Diameter message whose DEST-HOST is Server; if the message is successfully received and a successful response message is received, it indicates that DRA1-DRA3-Server has returned to normal, DRA1 modifies the recorded routing status of DRA1-DRA3-Server to be normal.

Otherwise, DRA1 can receive an ERROR message returned by DRA3, which indicates that link of DRA3-Server still is faulty; DRA1 can maintain the routing status of DRA1-DRA3-Server and restart the timer, sends the Diameter message whose DEST-HOST is Server through the alternative routing if the timer does not expire, and repeats the above attempt process after the timer expires, and so on. As should be noted, every timing time of timer could be same or not.

In addition, during every timing period of the timer, i.e., when the timing is not expired, if DRA1 receives a message sent by DRA3 whose ORIGINAL-HOST (namely sender) is Server, it indicates that the failure of routing of DRA1-DRA3-Server has been relieved, and DRA1 can refresh the routing states of the routing DRA1-DRA3-Server to be normal.

The present embodiment, on the one hand, not only can effectively avoid frequently sending a Diameter message on a faulty routing, thereby effectively avoids wasting the capacity of the link, decreases message forwarding time delay and obviously prompts a user's business experience, on the other hand, but also can learn that the failure of the primary routing has been relieved in time so as to resume the operation of the faulty routing to effectively guarantee the communication performance of the Diameter network. In addition, there is no need to modify a current Diameter protocol in this embodiment, no any adverse influence on each node of Diameter and group network, and it is possible to implement compatibility with the current Diameter protocol.

Figure 5:
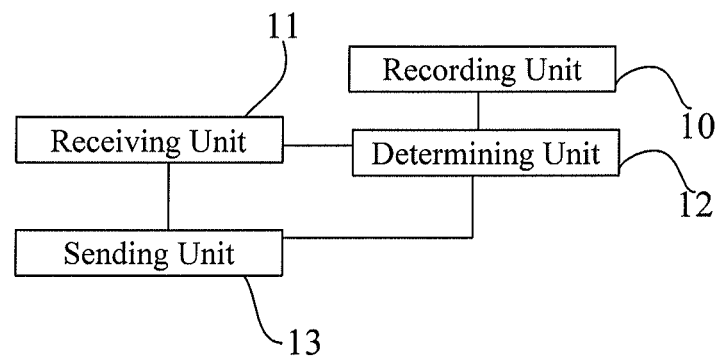
FIG. 5 is one block diagram illustrating DRA provided by one embodiment of the present disclosure.

Corresponding to the aforementioned method, embodiments of the present disclosure also provide a network apparatus as shown in FIG. 5 including:

a recording unit 10 for recording routing status from the network apparatus to a destination node;

Herein the routings from the network apparatus to a destination node can includes a primary routing and an alternative routing. The primary routing refers to the routing having a highest priority, i.e., when receiving Diameter message configured to be delivered to the destination node, the network apparatus can firstly select the primary routing to send the message; the alternative routing refers to the routing having a priority lower than that of the primary routing;

a receiving unit 11 is configured to receive a first Diameter message configured to be delivered to a destination node;

a determining unit 12 is configured to determine a routing status of a primary routing from the network apparatus to the destination node, according to the routing status recorded by the recording unit 10; and a sending unit 13 is configured to send the first Diameter message through the primary routing if the routing status of the primary routing is normal, and to send the first Diameter message through an alternative routing from the network apparatus to the destination node if the routing status of the primary routing is faulty.

When receiving the first Diameter message configured to be delivered to the destination node, the network apparatus provided by the embodiments of the present disclosure can query routing status of routings from the network apparatus to the destination node, and select a routing whose routing status is normal to send the Diameter message, whereby frequently sending a Diameter message on a faulty routing can be effectively avoided, thereby effectively avoiding wasting the capacity of the link, decreasing message forwarding time delay and obviously prompting a user's business experience.

Figure 6:
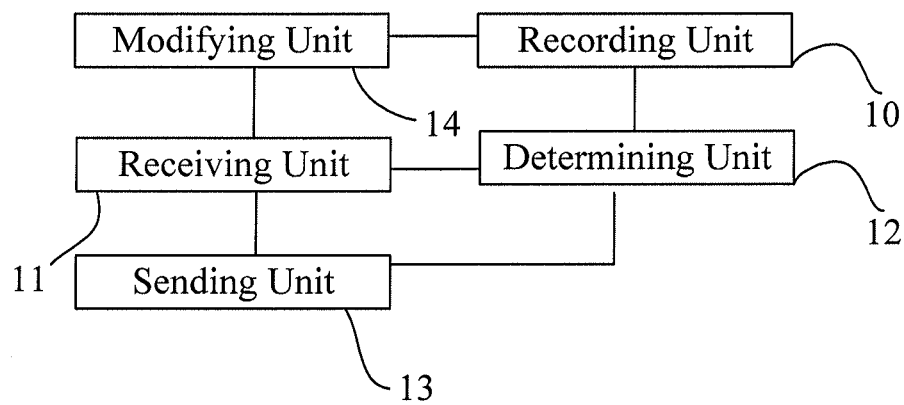
FIG. 6 is one block diagram illustrating DRA provided by one embodiment of the present disclosure.

Further, in one embodiment of the present disclosure, the network apparatus further includes a modifying unit 14, as shown in FIG. 6;

after the sending unit 13 has sent the first Diameter message through the primary routing, the receiving unit 11 is further configured to receive an error message, that is returned through the primary routing and that indicates the failure of delivery of the second Diameter message to the destination node;

Correspondingly, the modifying unit 14 is configured to modify the routing status of the primary routing recorded by the recording unit 10 as faulty, and the sending unit 13 can resend the first Diameter message through the alternative routing.

Optionally, in one embodiment of the present disclosure, after the modifying unit 14 has modified the routing status of the primary routing recorded by the recording unit 10 as faulty, the receiving unit 11 is further configured to receive a Diameter message that is sent by the destination node through the primary routing, and herein the modifying unit 14 modifies the routing status of the primary routing recorded by the recording unit 10 to be normal.

Optionally, in one embodiment of the present disclosure, the receiving unit 11 is further configured to receive a second Diameter message configured to be delivered to the destination node, after a first predetermined time arrives, the modifying unit 14 modifies the routing status of the primary routing as faulty, and the sending unit 13 resends the first Diameter message through the alternative routing.

Correspondingly, the sending unit 13 sends, through the primary routing, the second Diameter message received by the receiving unit 11.

If the sending unit 13 successfully sends, through the primary routing, the second Diameter message received by the receiving unit 11 through, the modifying unit 14 modifies the routing status of the primary routing recorded by the recording unit 10 to be normal.

If the sending unit 13 fails to send, through the primary routing, the second Diameter message received by the receiving unit 11 through, after the receiving unit 11 has received the error message that is returned through the primary routing and that indicates the failure of delivery of the second Diameter message to the destination node, the receiving unit 11 receives a third Diameter message required to be sent to the destination node after a second predetermined time. If the sending unit 13 successfully sends, through the primary routing, the third Diameter message received by the receiving unit 11 through, the modifying unit 14 modifies the routing status of the primary routing recorded by the recording unit 10 to be normal.

Optionally, in one embodiment of the present disclosure, after the modifying unit 14 modifies the routing status of the primary routing recorded by the recording unit 10 as faulty, the receiving unit 11 is further configured to receive a fourth Diameter message sent by the destination node through the primary routing; the modifying unit 14 is further configured to modifying the routing status of the primary routing recorded by the recording unit to be normal, when the receiving unit 11 receives the fourth Diameter message sent by the destination node through the primary routing.

The network apparatus provided by the embodiments of the present disclosure, on the one hand, not only can effectively avoid frequently sending a Diameter message on a faulty routing, thereby effectively avoids wasting the capacity of the link, decreases message forwarding time delay and obviously prompts a user's business experience, on the other hand, but also can learn that the failure of the primary routing has been relieved in time so as to resume the operation of the faulty routing to effectively guarantee the communication performance of the Diameter network. In addition, there is no need to modify a current Diameter protocol in this embodiment, no any adverse influence on each node of Diameter and group network, and it is possible to implement compatibility with the current Diameter protocol.

The network apparatus can be a DRA apparatus, also can be other apparatus based on a Diameter message in a network.

As comprehensible to persons ordinarily skilled in the art, the entire or partial steps in the various methods of the foregoing embodiments can be realized by a program that instructs relevant hardware such as a server including a hardware processor and computer-readable storage medium accessible to the hardware processor, and the aforementioned program can be stored in the computer-readable storage medium and, when executed, executes the steps of the aforementioned method embodiments; the storage medium may include such program-code-storing medium as a ROM, RAM, a magnetic disk or an optical disk.

The above is merely directed to preferred specific embodiments of the present disclosure, but the protection scope of the present disclosure is not restricted thereto, as any modifications or substitutions easily conceivable to persons skilled in the art within the scope as disclosed herein shall all be covered by the protection scope of the present disclosure. Therefore, the protection scope of the present disclosure shall be determined by the protection scopes of the claims.

The invention claimed is:

1. A method for managing Diameter routing in a Diameter network, comprising:

receiving, by a network apparatus, a first Diameter message configured to be delivered to a destination node, wherein communications between the network apparatus and the destination node are through a network element in the Diameter network and the network element forwards the first Diameter message from the network apparatus to the destination node;

determining, by the network apparatus, a routing status of a primary routing from the network apparatus to the destination node, according to recorded routing status from the network apparatus to the destination node;

sending, by the network apparatus, the first Diameter message through the primary routing, if the routing status of the primary routing is normal; and sending, by the network apparatus, the first Diameter message through an alternative routing from the network apparatus to the destination node, if the routing status of the primary routing is faulty, and after sending, by the network apparatus, the first Diameter message through the primary routing:

receiving, by the network apparatus, an error message returned through the primary routing, wherein the error message indicates that the first Diameter message is not delivered to the destination node due to a link from the network element to the destination node is faulty; and modifying, by the network apparatus, the routing status of the primary routing as faulty according to the error message, and resending, by the network apparatus, the first Diameter message through the alternative routing, wherein the alternative routing is a routing from the network apparatus to the destination node through another different network element.

2. The method according to claim 1, wherein after modifying, by the network apparatus, the routing status of the primary routing as faulty, and resending the first Diameter message through the alternative routing, the method further comprises:
  after a first predetermined time, sending, by the network apparatus, a second Diameter message through the primary routing, if the network apparatus receives the second Diameter message configured to be delivered to the destination node; and
  modifying, by the network apparatus, the recorded routing status of the primary routing to be normal, if the message is successfully sent.

3. The method according to claim 1, wherein after modifying, by the network apparatus, the routing status of the primary routing as faulty, and resending the first Diameter message through the alternative routing, the method further comprises:
  receiving, by the network apparatus, a fourth Diameter message sent by the destination node through the primary routing; and
  modifying, by the network apparatus, the recorded routing status of the primary routing to be normal.

4. The method according to claim 2, wherein after modifying, by the network apparatus, the routing status of the primary routing as faulty, and resending the first Diameter message through the alternative routing, the method further comprises:
  receiving, by the network apparatus, a fourth Diameter message sent by the destination node through the primary routing; and
  modifying, by the network apparatus, the recorded routing status of the primary routing to be normal.

5. The method according to claim 2, wherein after sending, by the network apparatus, the second Diameter message through the primary routing, the method further comprises:
  receiving, by the network apparatus, an error message returned through the primary routing, wherein the error message indicates that the second Diameter message is not delivered to the destination node; and
  after a second predetermined time, sending, by the network apparatus, a third Diameter message through the primary routing, if the network apparatus receives the third Diameter message configured to be delivered to the destination node;
  modifying, by the network apparatus, the recorded routing status of the primary routing to be normal, if the message is successfully sent.

6. The method according to claim 5, wherein after modifying, by the network apparatus, the routing status of the primary routing as faulty, and resending the first Diameter message through the alternative routing, the method further comprises:
  receiving, by the network apparatus, a fourth Diameter message sent by the destination node through the primary routing; and
  modifying, by the network apparatus, the recorded routing status of the primary routing to be normal.

7. A network apparatus, comprising:
  a processor configured to record routing status from the network apparatus to a destination node, wherein communications between the network apparatus and the destination node are through a network element in the Diameter network and the network element forwards the first Diameter message from the network apparatus to the destination node;
  a receiver configured to receive a first Diameter message configured to be delivered to a destination node;
  wherein the processor is further configured to determine a routing status of a primary routing from the network apparatus to the destination node, according to the recorded routing status; and
  the network apparatus further comprises a sender configured to send the first Diameter message through the primary routing if the routing status of the primary routing is normal, and to send the first Diameter message through an alternative routing from the network apparatus to the destination node if the routing status of the primary routing is faulty,
  wherein:
  the receiver is further configured to receive an error message returned through the primary routing, wherein the error message indicates that the first Diameter message is not delivered to the destination node due to a link from the network element to the destination node is faulty;
  the processor is further configured to modify the routing status of the primary routing recorded by the processor as faulty according to the error message after the receiver has received the error message;
  and the sender is further configured to resend the first Diameter message through the alternative routing after the receiver has received the error message, wherein the alternative routing is a routing from the network apparatus to the destination node through another different network element.

8. The network apparatus according to claim 7, wherein the receiver is further configured to receive a second Diameter message configured to be delivered to the destination node after a first predetermined time, after the processor has modified the routing status of the primary routing as faulty, and the sender has resent the first Diameter message through the alternative routing;
  that the sender is further configured to send the second Diameter message received by the receiver;
  and that the processor is further configured to modify the routing status of the primary routing recorded by the processor to be normal, if the second Diameter message received by the receiver is successfully sent by the sender through the primary routing.

9. The network apparatus according to claim 7, wherein the receiver is further configured to receive a fourth Diameter message sent by the destination node through the primary routing;
  and that the processor is further configured to modify the routing status of the primary routing recorded by the processor to be normal, when the receiver receives the fourth Diameter message sent by the destination node through the primary routing.

10. The network apparatus according to claim 8, wherein the receiver is further configured to receive a fourth Diameter message sent by the destination node through the primary routing;
  and that the processor is further configured to modify the routing status of the primary routing recorded by the processor to be normal, when the receiver receives the fourth Diameter message sent by the destination node through the primary routing.

11. The network apparatus according to claim 8, wherein the receiver is further configured to receive an error message through after the sender has sent the second Diameter message through the primary routing, and receive a third Diameter message configured to be delivered to the destination node after a second predetermined time, wherein the error message is returned through the primary routing and indicates the failure of delivery of the second Diameter message to the destination node;

that the sender is further configured to send the third Diameter message received by the receiver through the primary routing;

and that the processor is further configured to modify the routing status of the primary routing recorded by the processor to be normal, if the third Diameter message received by the receiver is successfully sent by the sender through the primary routing.

12. The network apparatus according to claim 11, wherein the receiver is further configured to receive a fourth Diameter message sent by the destination node through the primary routing;

and that the processor is further configured to modify the routing status of the primary routing recorded by the processor to be normal, when the receiver receives the fourth Diameter message sent by the destination node through the primary routing.

13. A network device, comprising a hardware processor and a non-transitory storage medium accessible to the hardware processor, the processor is configured to:

record routing status from the network apparatus to a destination node, wherein communications between the network apparatus and the destination node are through a network element in the Diameter network and the network element forwards the first Diameter message from the network apparatus to the destination node;

receive a first Diameter message configured to be delivered to a destination node;

determine a routing status of a primary routing from the network apparatus to the destination node, according to the recorded routing status; and send the first Diameter message through the primary routing if the routing status of the primary routing is normal, and to send the first Diameter message through an alternative routing from the network apparatus to the destination node if the routing status of the primary routing is faulty, wherein after sending the first Diameter message through the primary routing, the processor is further configured to:

receive an error message returned through the primary routing, wherein the error message indicates that the first Diameter message is not delivered to the destination node due to a link from the network element to the destination node is faulty; and modify the routing status of the primary routing as faulty according to the error message, and resending the first Diameter message through the alternative routing, wherein the alternative routing is a routing from the network apparatus to the destination node through another different network element.

* * * * *